United States Patent
Basson et al.

(10) Patent No.: US 8,327,294 B2
(45) Date of Patent: Dec. 4, 2012

(54) METHOD AND SYSTEM TO REDUCE WORKLOAD AND SKILLS REQUIRED IN USAGE OF MOUSE OR OTHER POINTING DEVICES

(75) Inventors: Sara H. Basson, White Plains, NY (US); Peter G. Fairweather, Yorktown Heights, NY (US); Alexander Faisman, Croton-on-Hudson, NY (US); Genady Grabarnik, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 12/174,671

(22) Filed: Jul. 17, 2008

(65) Prior Publication Data
US 2010/0017757 A1 Jan. 21, 2010

(51) Int. Cl.
G06F 3/048 (2006.01)
(52) U.S. Cl. .................................. 715/862; 715/858
(58) Field of Classification Search .................. 715/858, 715/862, 859
See application file for complete search history.

(56) References Cited

U.S. PATENT DOCUMENTS

| | | | | |
|---|---|---|---|---|
| 4,698,625 A | * | 10/1987 | McCaskill et al. | 345/157 |
| 4,987,411 A | * | 1/1991 | Ishigami | 345/159 |
| 5,012,231 A | | 4/1991 | Felsenstein | |
| 5,565,888 A | * | 10/1996 | Selker | 715/823 |
| 5,570,111 A | | 10/1996 | Barrett et al. | |
| 5,757,358 A | * | 5/1998 | Osga | 715/862 |
| 5,896,123 A | * | 4/1999 | Nagahara et al. | 715/858 |
| 6,236,989 B1 | | 5/2001 | Mandyam et al. | |
| 6,337,694 B1 | * | 1/2002 | Becker et al. | 345/684 |
| 6,353,850 B1 | | 3/2002 | Wies et al. | |
| 6,392,675 B1 | * | 5/2002 | Becker et al. | 715/858 |
| 6,954,899 B1 | | 10/2005 | Anderson | |
| 7,042,439 B2 | | 5/2006 | Luo | |
| 7,051,080 B1 | | 5/2006 | Paul et al. | |
| 2001/0002126 A1 | * | 5/2001 | Rosenberg et al. | 345/156 |
| 2002/0027565 A1 | * | 3/2002 | Syukri | 345/684 |
| 2002/0171690 A1 | * | 11/2002 | Fox et al. | 345/862 |
| 2006/0244734 A1 | * | 11/2006 | Hill et al. | 345/173 |
| 2006/0288314 A1 | * | 12/2006 | Robertson | 715/863 |
| 2008/0168364 A1 | * | 7/2008 | Miller et al. | 715/762 |

FOREIGN PATENT DOCUMENTS

| | | | |
|---|---|---|---|
| JP | 04238524 A | * | 8/1992 |
| JP | 10222307 A | * | 8/1998 |
| JP | 2009211428 A | * | 9/2009 |

* cited by examiner

*Primary Examiner* — William Bashore
*Assistant Examiner* — Gregory A Distefano
(74) *Attorney, Agent, or Firm* — Scully, Scott, Murphy & Presser, P.C.; Anne V. Dougherty, Esq.

(57) ABSTRACT

A method and system are disclosed for controlling operation of a cursor on a display screen of a computer system. In the operation of the computer system, one or more areas on the display screen are designated as user interface areas for receiving input from a user via a Graphical User Interface. The preferred method of this invention comprises the steps of, for each of the user interface areas, designating an area on the display screen as an associated cursor-auto area; and the user applying input to the computer system to move the cursor on the display screen and into one of the cursor-auto areas. When the cursor moves into said one of the cursor-auto areas, the computer system automatically performs a predefined operation to associate visually the cursor with the user interface area associated with said one of the cursor-auto areas.

20 Claims, 4 Drawing Sheets

- - - "GRAVITY" - AFFECTED MOVEMENT OF THE POINTER
- - TRADITIONAL MOVEMENT OF THE POINTER

— ·· — "GRAVITY" - AFFECTED MOVEMENT OF THE POINTER
— — — TRADITIONAL MOVEMENT OF THE POINTER

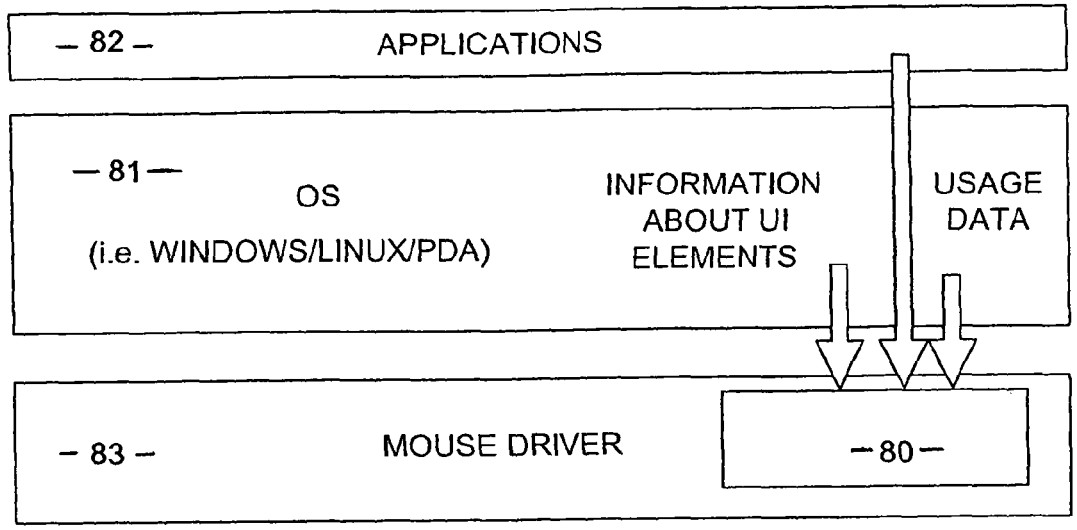
FIG. 5 LOGIC WITHIN MOUSE DRIVER (LOWER LEVEL THEN OS)
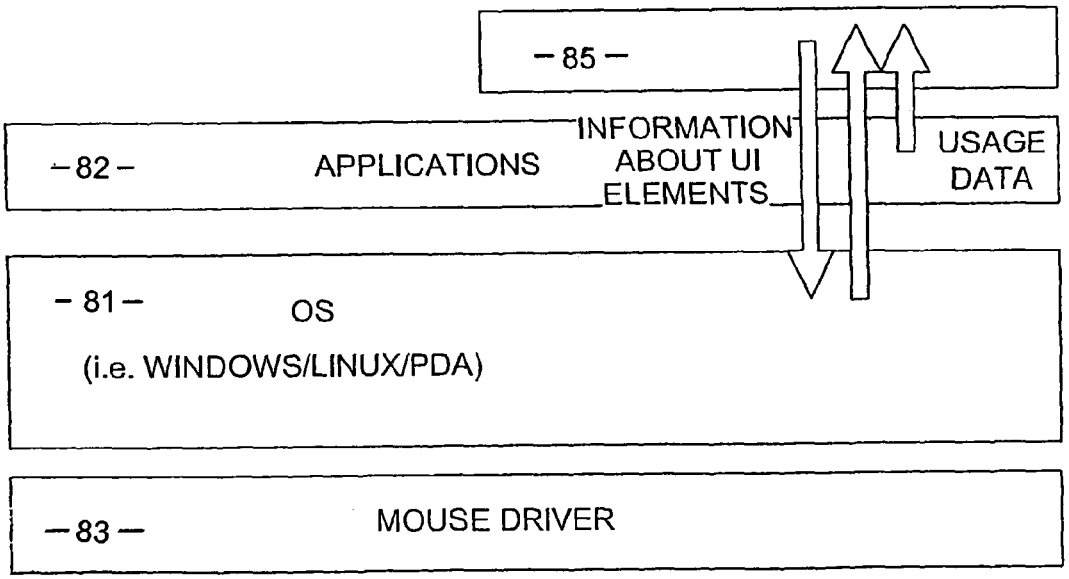
FIG. 6 2. LOGIC IS ON HIGHER LEVEL THEN OS

METHOD AND SYSTEM TO REDUCE WORKLOAD AND SKILLS REQUIRED IN USAGE OF MOUSE OR OTHER POINTING DEVICES

BACKGROUND OF THE INVENTION

1. Field of the Invention

This invention generally relates to Graphical User Interfaces for computers and processing systems, and more specifically, the invention relates to a method and apparatus for controlling use of a symbol, such as a cursor, on a Graphical User Interface.

2. Background Art

In a Graphical User Interface (GUI), various images, including icons, windows containing application programs, etc., appear on a display screen. The icons and windows are graphical representations of application programs or utility functions. The user operates the system by moving images on the screen, and by providing input signals to the system, which the system interprets as commands to operate the application programs or utility functions. Commonly, the image, which the user moves about the screen, is a cursor, although the user can also move other types of images around. Persons skilled in the use of GUIs will readily recognize that the cursor must be precisely positioned on the desired icon, application program button, etc., for the input signals to be interpreted as desired. To move the cursor on the screen, the user employs a user interface apparatus which includes a transducer for translating the user's activity, such as hand movements, fingertip pressure, etc., into an input parameter. Various types of devices include such transducers.

A popular device for enabling the user to perform cursor movements and to enter commands is called a mouse. A mouse is a mechanically simple device for producing a signal, responsive to physical displacement of the mouse by the user, which directs the system to move the cursor about the display screen. Generally, a mouse also includes one or more push buttons, which the user pushes in order to enter commands to the system. Responsive to a given movement of the mouse in a given direction, such as over a mouse pad or work surface, the cursor makes a movement in a corresponding direction on the display screen. In the case of a mouse, the input parameter can be a positional movement, i.e. a displacement or translation, or can also include factors relating to mouse velocity, as well as displacement.

A joystick may also be used for cursor movement. A typical joystick, such as that used in video games, is spring-biased in two dimensions to a middle position, corresponding with no cursor movement. Movement of the joystick responsive to user manipulation causes cursor movement. For such joysticks, displacement of the joystick, or a magnitude of force applied against it, serve as the input parameter. In general, the input parameter of a joystick is position, i.e., displacement from a resting position, and the mapping is from joystick position to cursor velocity (or, in some systems, cursor position).

Yet another type of user input device is generically called an isometric joystick. An isometric joystick is implemented as the TrackPoint II pointing device, currently available in the ThinkPad line of laptop computers by IBM Corporation. (TrackPoint II, ThinkPad, and IBM are registered trademarks of International Business Machines Corporation.) ThinkPad laptop computers include TrackPoint II pointing devices, conveniently built into the middle of the keyboard, between the G and H keys. ThinkPad units also include keyboard buttons, analogous to mouse buttons, for entering system commands. A user operates this device by pushing laterally against the top of the device with his/her fingertip. The device does not actually displace, as in the case with a joystick. The input parameter is the force applied by the user, and the force is mapped to cursor movement. The force against the device is sensed, and the cursor movement is made at a rate determined by the transfer function, over the length of time the pressure is applied.

Mice and joysticks have in common the fact that cursor movement is related to an input parameter whose value is determined by user manipulation. In order to use one of these user interface devices effectively and comfortably, the user must develop a hand-eye coordination to efficiently move the cursor where he or she wants it to go. Whether this coordination will be comfortable for the user depends greatly on both the intrinsic feel of the interface device, i.e., the nature of the user manipulation, which produces the input parameter, and the particular transfer function which translates, or maps, the input parameter to actual cursor movement.

The eye and hand strain involved in moving the mouse cursor and focusing it on, for example, a small button on the screen causes an unnecessary amount of work for the user. Even small differences in the user interface (i.e., a few pixels of mouse movement) may have a relatively large effect on the meaning of the user input (i.e., the required button will be pressed or not). This is especially noticeable when one has to do a lot of work that involves pointing and clicking the mouse cursor. One possible solution for this problem is the use of keyboard shortcuts. However, these are application-dependant, require large amounts of memorization, and may be impractical in large programs with many functions. Also, people may have skills and usability limitations that affect their ability to use the pointing device. For example, for some people with restricted hand movement or restricted eyesight, to put mouse pointer into appropriate spot of the windows may be a significant problem.

SUMMARY OF THE INVENTION

An object of this invention is to improve Graphical User Interfaces.

Another object of the present invention is to simplify the usage of a pointing device, such as a mouse, in a Graphical User Interface.

A further object of one embodiment of the invention is to make a mouse curser slightly attracted to predefined areas on a computer display screen.

Another object of another embodiment of the invention is to use a set of visual clues to indicate a logical attachment between the current location of a cursor on a computer display screen and predefined areas on that screen.

These and other objectives are attained with a method of and system for controlling operation of a cursor on a display screen of a computer system. In the operation of the computer system, one or more areas on the display screen are designated as user interface areas for receiving input from a user via a Graphical User Interface. The preferred method of this invention comprises the steps of, for each of the user interface areas, designating an area on the display screen as an associated cursor-auto area; and the user applying input to the computer system to move the cursor on the display screen and into one of the cursor-auto areas. When the cursor moves into said one of the cursor-auto areas, the computer system automatically performs a predefined operation to associate visually the cursor with the user interface area associated with said one of the cursor-auto areas.

According to one embodiment of the invention, one solution to the problem of user eyestrain is to make the mouse cursor slightly attracted toward predefined, clickable areas on the display screen. If this is implemented in programs, then the user would not have to focus so much on the mouse cursor directly hitting an on-screen button, because the cursor sill be slightly attracted to the button when the cursor is in the vicinity of the button.

According to another embodiment of the invention, another solution is to create a set of visual clues to indicate a logical attachment between the current location of the cursor and clickable areas. The cursor may be located outside of the clickable area, but the visual clue indicates that the mouse, and specifically, the results of pressing a mouse button, will be associated with the area.

Each of these embodiments can be implemented in a number of ways. In one implementation, the related code needed to perform the invention is located within a mouse driver. The code has access to the current content of the User Interface—locations, sizes, status and other information about visible UI elements such as buttons, scroller, combo boxes and textboxes. In another implementation, the code needed to perform the invention can be located outside of the mouse driver. The relevant information can be received by communication with the Operating System of the computer system and with the applications used with the computer system.

Further benefits and advantages of the invention will become apparent from a consideration of the following detailed description, given with reference to the accompanying drawing, which specifies and shows preferred embodiments of the invention.

BRIEF DESCRIPTION OF THE DRAWINGS

FIG. 5 shows an example architecture in which code for implementing this invention is located within a mouse driver.

FIG. 6 shows another example architecture in which code for implementing this invention is located outside of the mouse driver.

DETAILED DESCRIPTION OF THE PREFERRED EMBODIMENTS

Figure 1:
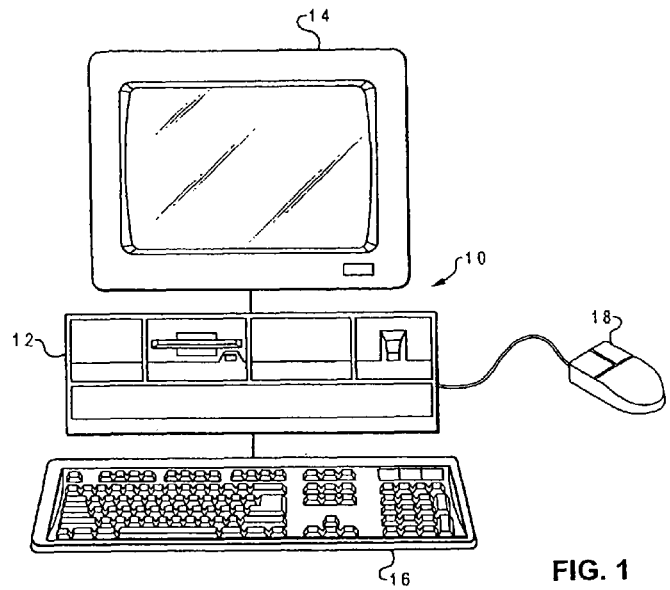
FIG. 1 is a pictorial representation of a computer in which the method and system of the present invention are implemented.

With reference now to the figures and, in particular, with reference to FIG. 1, there is depicted a pictorial representation of a data-processing system in which the present invention may be implemented in accordance with a preferred embodiment of the present invention. A personal computer 10 is depicted which includes a system unit 12, a video display terminal 14, an alphanumeric input device (i.e., keyboard 16) having alphanumeric and other keys, and a mouse 18. An additional input device (not shown), such as a trackball or stylus, also can be included with personal computer 10. Computer 10 can be implemented utilizing any suitable computer, such as an IBM Aptiva computer, a product of International Business Machines Corporation, located in Armonk, N.Y. "Aptiva" is a registered trademark of International Business Machines Corporation.

Although the depicted embodiment involves a personal computer, a preferred embodiment of the present invention may be implemented in other types of data-processing systems, such as, for example, intelligent workstations or minicomputers. Computer 10 also includes a graphical user interface that resides within a machine-readable media to direct the operation of computer 10.

Figure 2:
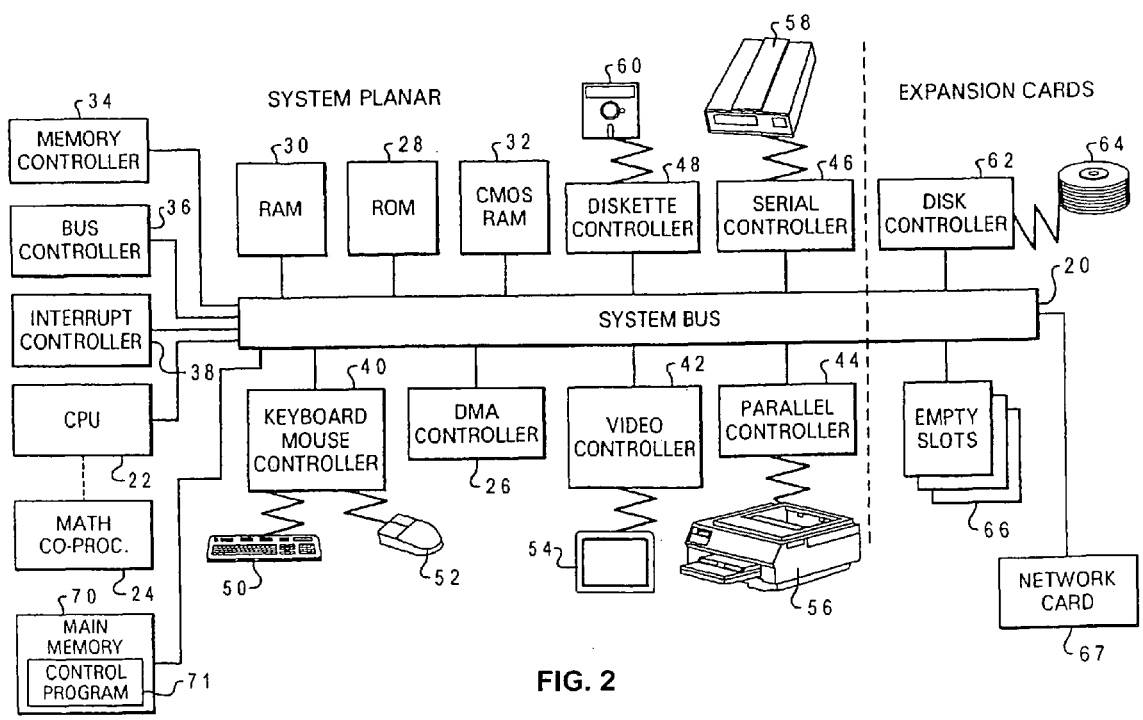
FIG. 2 is a block diagram illustrating selected components of the computer of FIG. 1.

Referring now to FIG. 2 there is depicted a block diagram of selected components in personal computer 10 of FIG. 1 in which a preferred embodiment of the present invention may be implemented. Personal computer 10 of FIG. 1 preferably includes a system bus 20, as depicted in FIG. 2. System bus 20 is utilized for interconnecting and establishing communication between various components in personal computer 10. Microprocessor or central processing unit (CPU) 22 is connected to system bus 20 and also may have numeric co-processor 24 connected to it. Direct memory access ("DMA") controller 26 also is connected to system bus 20 and allows various devices to appropriate cycles from CPU 22 during large input/output ("I/O") transfers. Read-only memory ("ROM") 28 and random-access memory ("RAM") 30 are also connected to system bus 20. ROM 28 is mapped into the microprocessor 22 address space in the range from 640K to 1 megabyte. CMOS RAM 32 is attached to system bus 20 and contains system-configuration information. Any suitable machine-readable media may retain the graphical user interface of computer 10 of FIG. 1, such as RAM 30, ROM 28, a magnetic diskette, magnetic tape, or optical disk.

Also connected to system bus 20 are memory controller 34, bus controller 36, and interrupt controller 38 which serve to aid in the control of data flow through system bus 20 between various peripherals, adapters, and devices. System unit 12 of FIG. 1 also contains various I/O controllers, such as those depicted in FIG. 2: keyboard and mouse controller 40, video controller 42, parallel controller 44, serial controller 46, and diskette controller 48. Keyboard and mouse controller 40 provide a hardware interface for keyboard 50 and mouse 52. Video controller 42 provides a hardware interface for video display terminal 54. Parallel controller 44 provides a hardware interface for devices, such as printer 56. Serial controller 46 provides a hardware interface for devices, such as a modem 58. Diskette controller 48 provides a hardware interface for floppy-disk unit 60. Other technologies also can be utilized in conjunction with CPU 22, such as touch-screen technology or human voice control. Main memory 70 is connected to system bus 20, and includes a control program 71.

As discussed above, in the operation of a computer system, the eye and hand strain involved in moving the mouse cursor and focusing the cursor on a small area, such as a small button, on the display screen causes an unnecessary amount of work for the user. This is especially noticeable when one has to do a lot of work that involves pointing and clicking the mouse cursor.

The present invention effectively addresses this issue. Generally, this is done by providing a method of and system for controlling operation of a cursor on a display screen of a computer system. In the operation of the computer system, one or more areas on the display screen are designated as user interface areas for receiving input from a user via a Graphical User Interface, and the user applies input to the computer system to move the cursor on the display screen. The preferred method of this invention comprises the steps of, for each of the user interface areas, designating an area on the display screen as an associated cursor-auto area; and when the cursor moves into one of the cursor-auto areas, the computer system automatically performs a predefined operation to associate visually the cursor with the user interface area associated with said one of the cursor-auto areas.

Figure 3A:
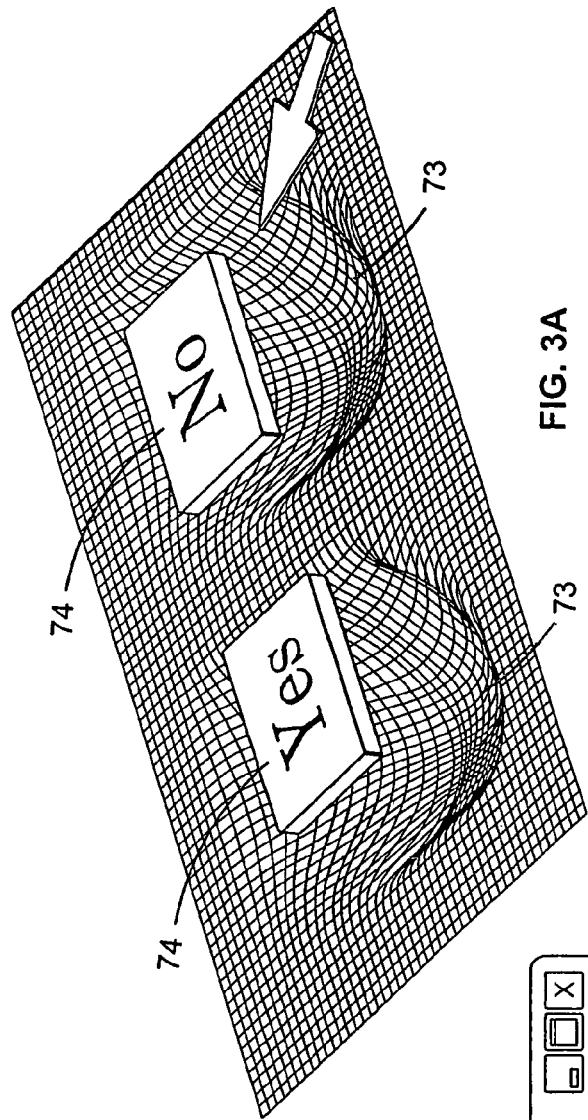
FIGS. 3a and 3b illustrate a feature of this invention referred to as gravity affected movement of a pointer on a computer display screen.
Figure 3B:
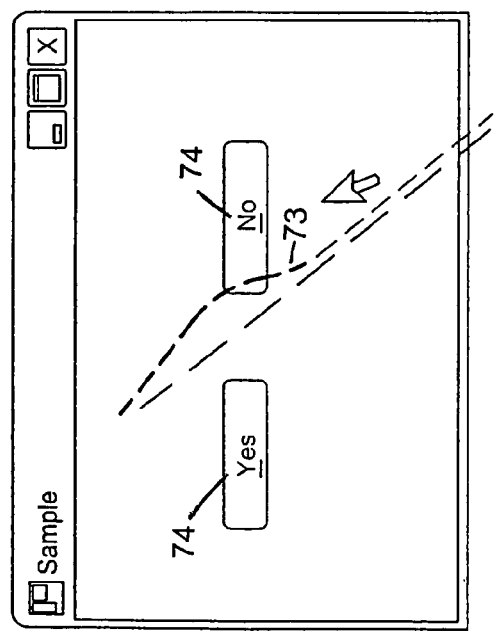

With a first embodiment of the invention, with reference to FIGS. 3a and 3b, when the cursor is moved into a defined area 73 that extends around a user input button 74 or other clickable area, the cursor becomes attracted to that clickable area 74—that is, the position of the cursor in the screen moves closer to that area 74 than the cursor would move due to the user's movement or manipulation of the mouse alone.

This attraction of the cursor can be described in various ways. For example, the surface of the screen can be described as covered by an icy layer. The buttons or other clickable areas will represent smooth shallow "holes" in the ices. The mouse cursor is driven by a regular mouse movement but still being attracted a little by the "holes" met during the movement.

This type of mouse behavior may be controlled by probability fields around different buttons. A higher probability field around a button may correspond to the mouse cursor moving towards the button faster and, in effect, auto-focusing on it when the user directs the cursor near the button. Different buttons on the screen may have either the same or different strength probability fields, which may be set by the user. If different buttons have different strength probability fields, then these strengths may either be pre-defined based on known statistical usage of the different buttons, or by user-specific probabilities gathered about the user's own clicking habits.

"Probability Fields" can be affected in multiple ways, including Proximity, Frequency, Type of Button, History, and Title.

Proximity refers to using the distance between the user's current position and the button(s) as a means to modulate the strength of the attraction. Frequency is based on the feature that one could develop a scheme where users are led along the paths where other users go most frequently.

"Type Of Button" refers to something that is more likely to be pressed than, say, an image map if everything else is "tied". (This would be a weak attraction or a weak attraction increment, easily overcome).

History is based on the concept that if the user has already been down the path associated with a clickable zone, then, all other things being equal, we shouldn't send her/him down again. (This would be a weak attraction, easily overcome). "Title" refers to the fact that some clickable areas, particularly buttons, have very predictable labels depending on the context. (If one goes to a commercial site, one is assured of seeing words like "checkout", "submit", etc. With certain prerequisites out of the way, one could establish a weak attraction that could be overcome by the user quite easily).

Figure 4A:
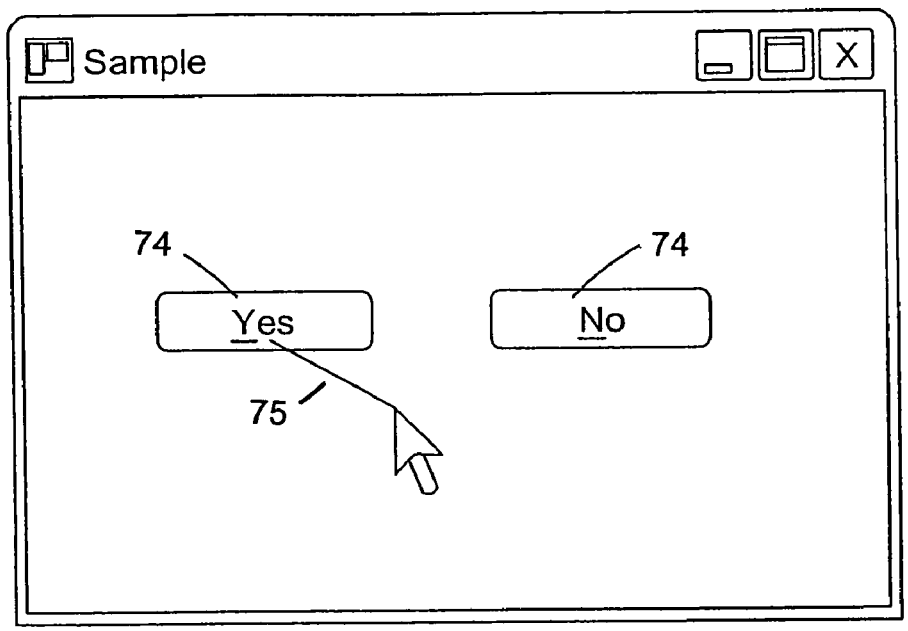
FIGS. 4a and 4b show the use of visual cues to indicate clickable areas associated with a cursor.
Figure 4B:
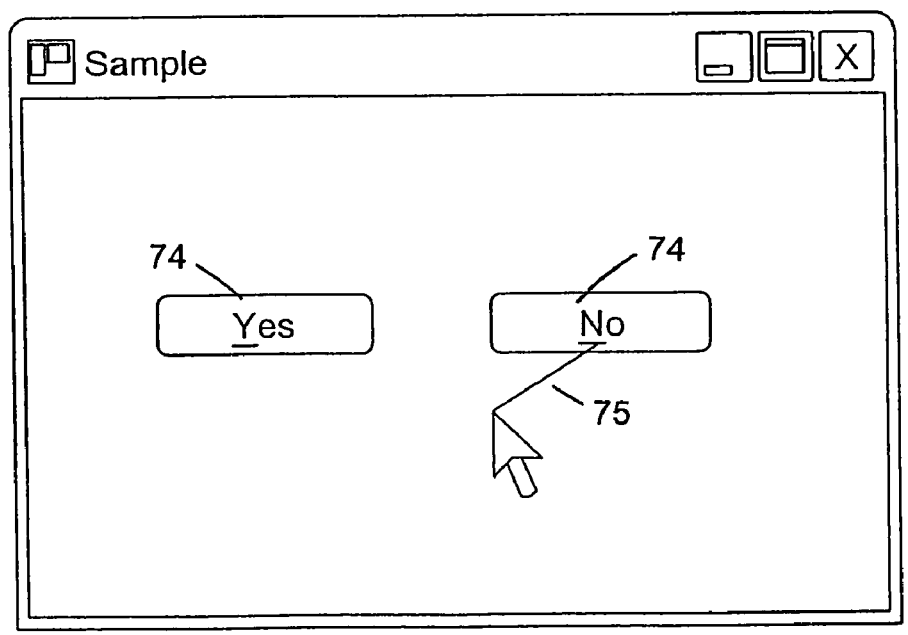

With a second embodiment of the invention, with reference to FIGS. 4a and 4b, visual clues 75, as displayed, indicating a logical attachment of the cursor and the clickable areas (i.e., buttons, table cells, etc.). This can be implemented by looking at the area closest or the closest important area to the current location of the cursor and visually grouping (for example connecting) the area with the cursor (for example by showing a line connecting the area and the cursor). The line or other connection can contain other hints about the specifics of the area or the possible click. For example, the thickness or a the color of the connection may indicate the meaning of the operation associated with the possible click.

Each of the above-described embodiments of the invention can be implemented in a number of ways.

In one implementation, the related code needed to perform the invention is located within the mouse driver, as illustrated at 80 in FIG. 5. The code has access to the current content of the User Interface—locations, sizes, status and other information about visible UI elements, such as buttons, scrollers, combo boxes and textboxes, windows, tables and so on. The information can be retrieved by communication with the Operating System 81 and, possibly with the applications 82 to retrieve the application specific data such as preferences, collected usage data and so on. The collected information can be used by the Mouse Driver 83 to change the behavior of the mouse pointer.

In another implementation, the code needed to perform the invention can be located outside of the Mouse Driver, as shown at 85 in FIG. 6. The relevant information can be received by communication with OS 81 and the applications 82. The behavior of the mouse pointer in this case is adjusted without any change of the Mouse Driver 83 functionality.

As will be readily apparent to those skilled in the art, the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which—comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of controlling operation of a cursor on a display screen of a computer system, wherein one a multitude of areas on the display screen are designated as user interface areas for receiving input from a user via a Graphical User Interface, the method comprising the steps of:

for each of the user interface areas, designating an area on the display screen as an associated cursor-auto area; the user applying input to the computer system to move the cursor on the display screen and into one of the cursor-auto areas;

when the cursor moves into said one of the cursor-auto areas, the computer system automatically performing a predefined operation to associate visually the cursor with the user interface area associated with said one of the cursor-auto areas;

for each of the user interface areas, identifying a controllable strength probability field around said each user interface area and determining an attraction strength attracting the cursor toward said each user interface area to vary a speed at which the cursor moves toward said each user interface area; and for each of the user interface areas, predefining the strength of the strength probability field around said each user interface area based on obtained probability factors specific to the user; and wherein:

the identifying a controllable strength probability field around said each user interface area includes, when the user has moved the cursor toward one of the user interface areas in the past, weakening the strength of the strength probability field around said one of the user interface areas to reduce the probability of the user again moving the cursor toward said one of the user interface areas; and at least some of the user interface areas have titles; and the attraction strength around each of said some of the user interface areas is determined by a multitude of factors including the title of said each user interface area.

2. A method according to claim 1, wherein the predefined operation is to move the cursor automatically toward the user interface area associated with said one of the cursor-auto areas.

3. A method according to claim 1, wherein the predefined operation is to display visually on the display screen a link connecting the cursor to the user interface area associated with said one of the cursor-auto areas.

4. A method according to claim 1, wherein the predefined operation is to move the cursor automatically at a defined rate toward the user interface area associated with said one of the cursor-auto areas.

5. A method according to claim 4, wherein said defined rate is based on the distance between said user interface area and the position to which the cursor is moved by the user.

6. A method according to claim 4, wherein said defined rate is based on the frequency at which the user moves the cursor to said one of the cursor-auto areas.

7. A method according to claim 4, wherein said defined rate is based on a history of use of said user interface area.

8. The method according to claim 1, wherein a mouse is used to apply the input to the computer system, a mouse driver is used to move the cursor, and the mouse driver includes processing code for designating the cursor-auto areas, for performing the predefined operation, and for identifying the strength probability fields, and wherein the method further comprises: using the mouse driver to retrieve application specific data including preferences and collected usage data; and the mouse driver using said retrieved data to change the behavior of the cursor.

9. The method according to claim 1, wherein the identifying a controllable strength probability field around said each user interface area includes, when the user has moved the cursor toward one of the user interface areas in the past, weakening the strength of the strength probability field around said one of the user interface areas to reduce the probability of the user again moving the cursor toward said one of the user interface areas.

10. The method according to claim 1, wherein:
the title of at least one of the user interface areas has a title is submit; and
said title of submit is one of the multitude of factors affecting the attraction strength around said at least one of the user interface areas.

11. The method according to claim 9, wherein:
the computer system includes at least one processing unit, an operating system, and an application; and the predefining the strength of the strength probability field around each user interface area includes obtaining said probability factors specific to the user from said application via said Operating System.

12. A cursor control system, in a computer system, for controlling operation of a cursor on a display screen of the computer system, wherein a multitude of areas on the display screen are designated as user interface areas for receiving input from a user via a Graphical User Interface, and the user applies inputs to the computer system to move the cursor on the display screen, the cursor control system comprising at least one processing unit having computer readable code configuring said at least one processing unit for:

designating, for each of the interface areas, an area on the display screen as an associated cursor-auto area;

in response to the user moving the cursor into one of the cursor-auto areas, automatically performing a predefined operation to associate visually the cursor with the user interface area associated with said one of the cursor-auto areas;

for each of the user interface areas, identifying a controllable strength probability field around said each user interface area determining an attraction strength attracting the cursor toward said each user interface area to vary a speed at which the cursor moves toward said each user interface area; and for each of the user interface areas, predefining the strength of the strength probability field around said each user interface area based on known statistical usage of said each user interface area; and wherein the identifying a controllable strength probability field around said each user interface area includes, when the user has moved the cursor toward one of the user interface areas in the past, weakening the strength of the strength probability field around said one of the user interface areas to reduce the probability of the user again moving the cursor toward said one of the user interface areas; and at least some of the user interface areas have titles; and the attraction strength around each of said some of the user interface areas is determined by a multitude of factors including the title of said each user interface area.

13. A cursor control system according to claim 12, wherein the computer system includes a mouse driver for converting the user input to movement of the cursor on the display screen, and wherein said computer readable code is on the mouse driver.

14. A cursor control system according to claim 13, wherein the computer system includes an Operating System and one or more applications, and said at least one processing unit is further configured for obtaining information about the user interface areas from said one or more applications via said Operating System.

15. A cursor control system according to claim 12, wherein the computer system includes an Operating system, and said at least one processing unit is further configured for obtaining information about the user interface areas from said Operating System.

16. A cursor control system according to claim 15, wherein the computer system further includes one or more applications, and said at least one processing unit is further configured for obtaining information about the user interface areas and about user preferences from said one or more applications.

17. An article of manufacture-comprising:
at least one computer usable device having computer readable program code tangibly embodied therein to execute a machine instruction in a processing unit, said computer readable program code executable by the processing unit to perform method steps for controlling operation of a cursor on a display screen of a computer system, wherein a multitude of areas on the display screen are designated as user interface areas for receiving input from a user via a Graphical User Interface, and the user applies input to the computer system to move the cursor on the display screen, said method steps comprising:

for each of the user interface areas, designating an area on the display screen as an associated cursor-auto area;

when the cursor moves into said one of the cursor-auto areas, automatically performing a predefined operation to associate visually the cursor with the user interface area associated with said one of the cursor-auto areas;

for each of the user interface areas, identifying a controllable strength probability field around said each user interface area determining an attraction strength attracting the cursor toward said each user interface area to vary a speed at which the cursor moves toward said each user interface area; and for each of the user interface areas, predefining the strength probability field around said each user interface area based on obtained probability factors specific to the user; and wherein:

the identifying a controllable strength probability field around said each user interface area includes, when the user has moved the cursor toward one of the user interface areas in the past, weakening the strength of the strength probability field around said one of the user interface areas to reduce the probability of the user again moving the cursor toward said one of the user interface areas; and at least some of the user interface areas have titles; and the attraction strength around each of said some of the user interface areas is determined by a multitude of factors including the title of said each user interface area.

18. An article of manufacture according to claim 17, wherein the predefined operation is to move the cursor automatically toward the user interface area associated with said one of the cursor-auto areas.

19. An article of manufacture according to claim 17, wherein the predefined operation is to display visually on the display screen a link connecting the cursor to the user interface area associated with said one of the cursor-auto areas.

20. An article of manufacture according to claim 17, wherein the predefined operation is to move the cursor automatically at a defined rate toward the user interface area associated with said one of the cursor-auto areas.

* * * * *